May 15, 1951 J. G. KING 2,552,722
ELECTROMAGNETIC ACCELEROMETER
Filed Aug. 9, 1948 3 Sheets-Sheet 2
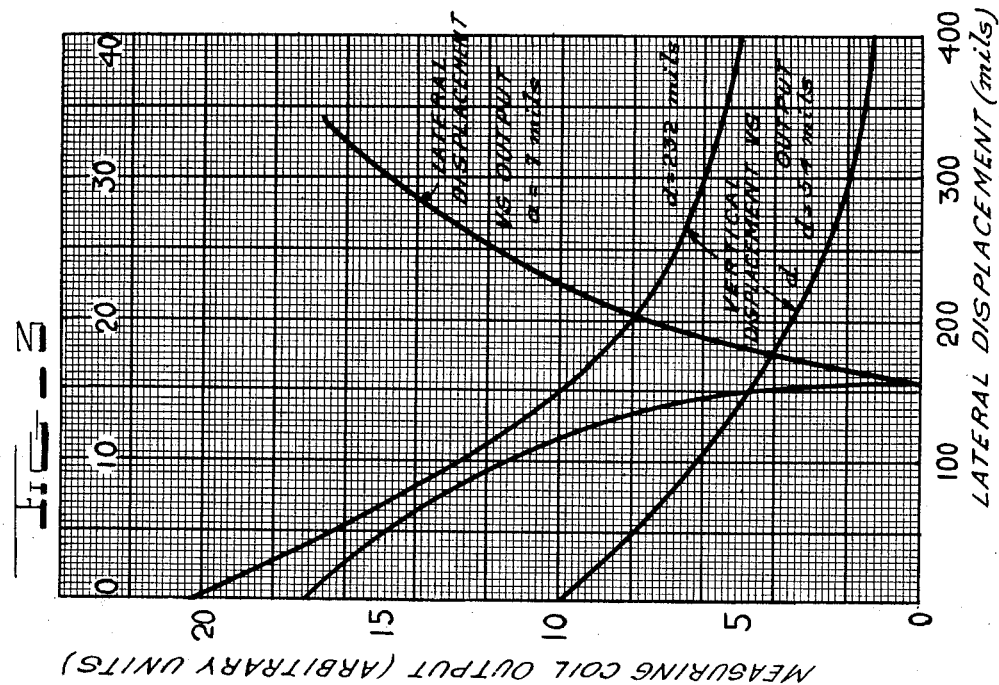
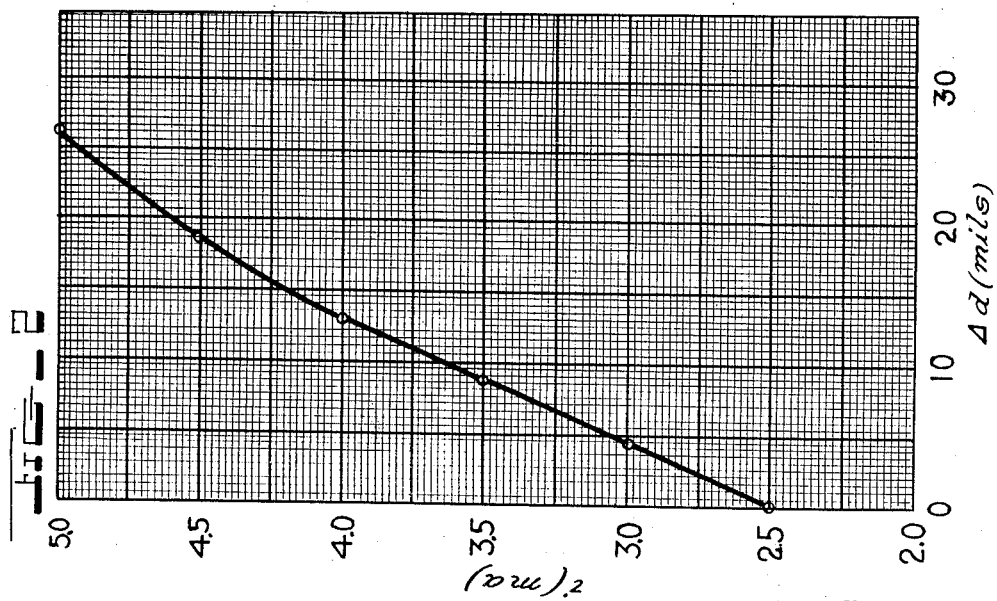
INVENTOR.
John G. King,
BY
John B. Brady
ATTORNEY

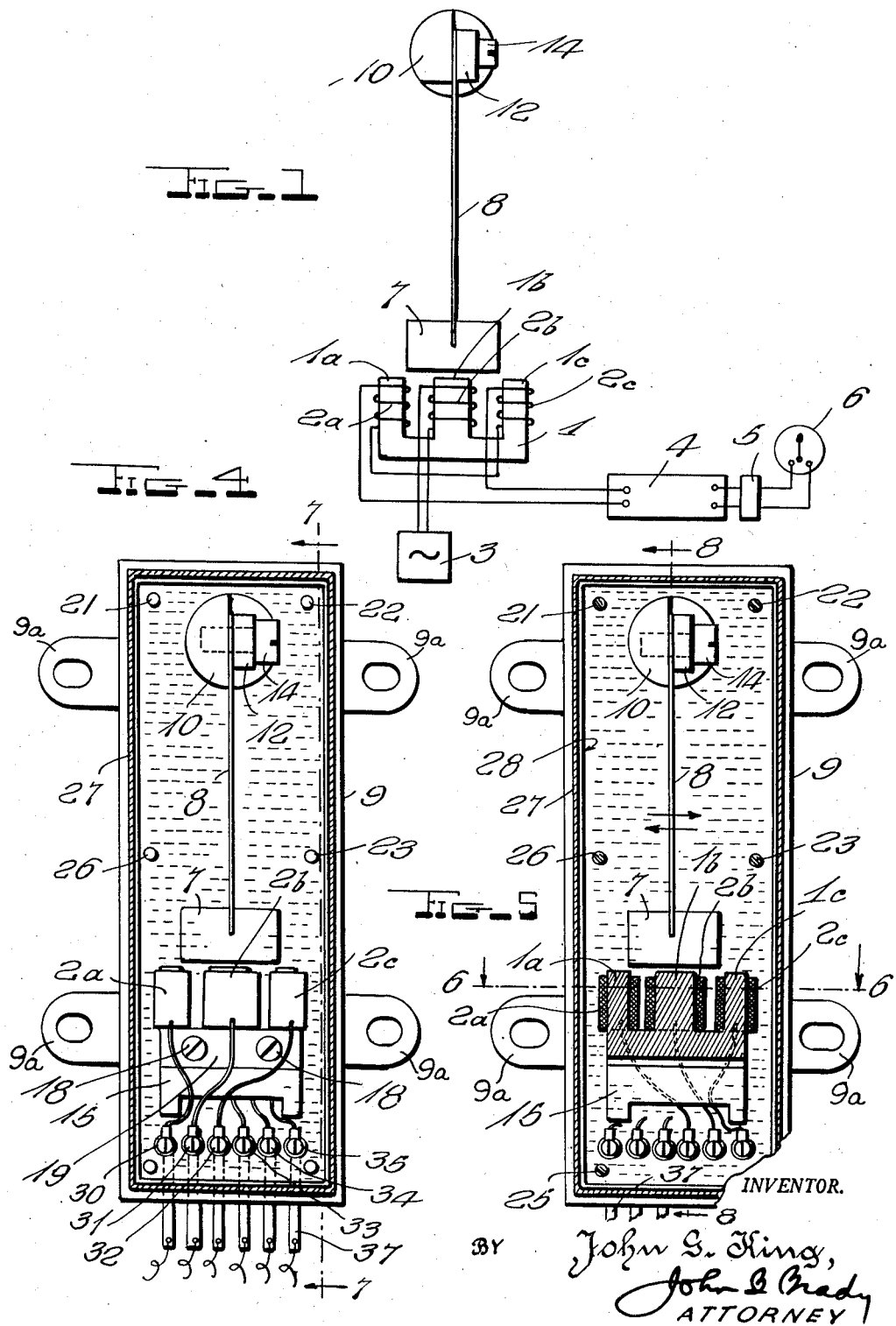

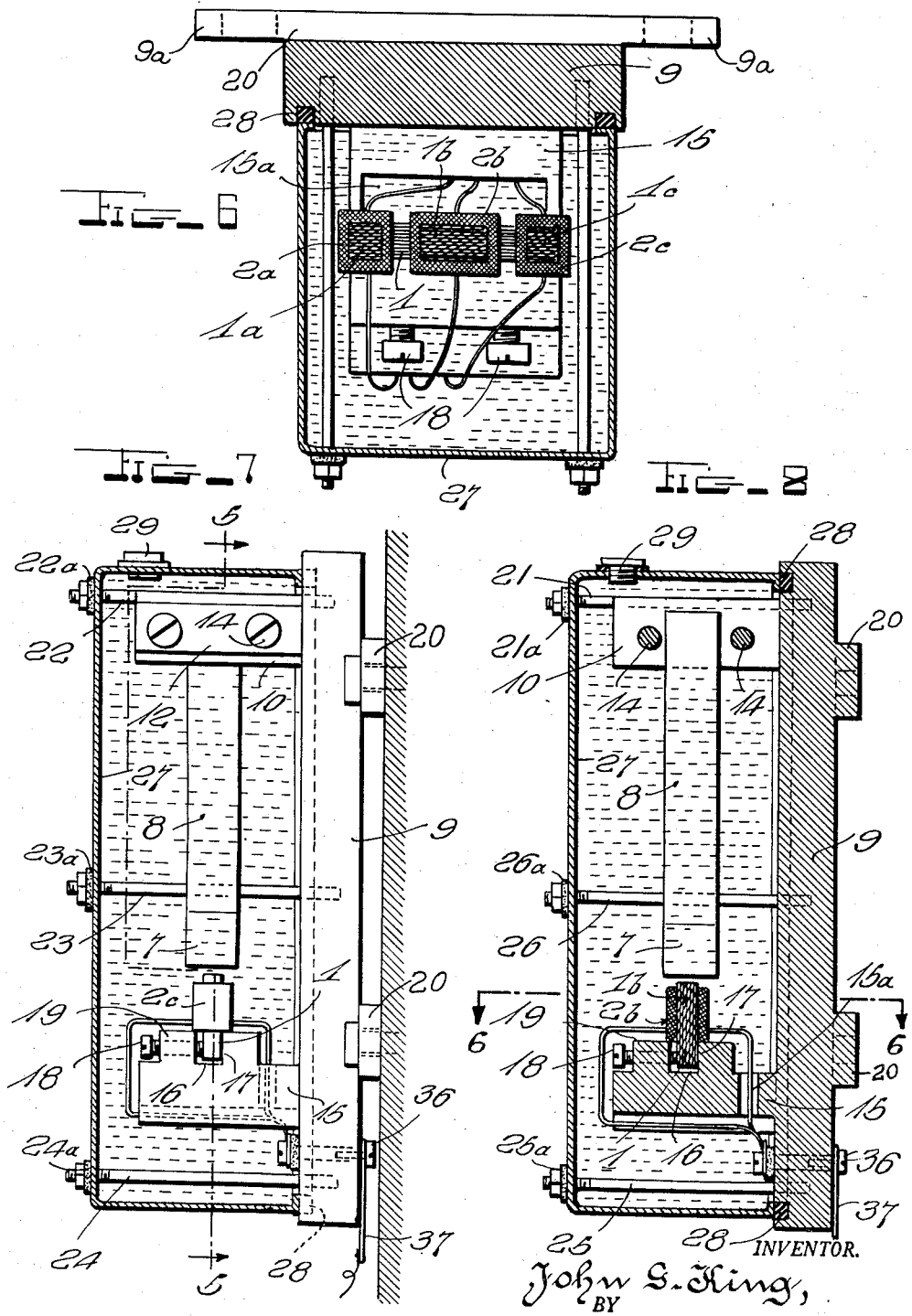

Patented May 15, 1951

2,552,722

UNITED STATES PATENT OFFICE 2,552,722

ELECTROMAGNETIC ACCELEROMETER

John G. King, Arlington, Mass., assignor, by mesne assignments, to The Pennsylvania Research Corporation, a corporation of Pennsylvania Application August 9, 1948, Serial No. 43,305

7 Claims. (Cl. 264—1)

My invention relates broadly to measuring instruments and more particularly to an improved construction of electromagnetic accelerometer.

One of the objects of my invention is to provide an efficient construction of electromagnetic accelerometer for accurately and directly measuring acceleration of mobile objects by readings of an electric metering device.

A further object of my invention is to provide a simplified construction of electromagnetic accelerometer which may be readily manufactured on a mass production scale at low cost and yet will give an accurate determination of acceleration of mobile objects.

Still another object of my invention is to provide a construction of electromagnetic accelerometer having a minimum number of moving parts, capable of rapid assembly in mass production of accelerometers to produce precision type instruments.

Another object of my invention is to provide an electromagnetic accelerometer for the measurement of linear accelerations of bodies to which it may be attached consisting of a spring-mass-dashpot system utilizing an electromagnetic E-coil pick-off where the designation E refers to the shape of the core bearing the coils.

A further object of my invention is to provide a construction of magnetic laminated E core device in the shape of the letter E having electromagnetic windings associated with each of the legs of the E core and co-acting with a displaceable magnetic mass for producing in the windings electrical currents which may be readily measured in a metering device for accurately indicating acceleration of the mobile body on which the device is installed.

Other and further objects of my invention reside in the construction of an instrument having a displaceable magnetic mass associated with an electromagnetic E core structure as set forth more fully in the specification hereinafter following by reference to the accompanying drawings, in which:

Figure 1 is a schematic and diagrammatic view illustrating the theory and application of my invention; Figs. 2 and 3 are curve diagrams showing the characteristics of the device of my invention; Fig. 4 is a front elevational view of the electromagnetic accelerometer of my invention; Fig. 5 is a vertical sectional view taken on line 5—5 of Fig. 7; Fig. 6 is a transverse sectional view taken substantially on line 6—6 of Fig. 5 and Fig. 8; Fig. 7 is a side elevational view of the electromagnetic accelerometer of my invention, parts being shown in section on line 7—7 of Fig. 4; and Fig. 8 is a vertical sectional view taken substantially on line 8—8 of Fig. 5.

My invention is directed to an instrument for measuring linear accelerations of bodies to which it may be attached. The instrument consists of a spring-mass dashpot system utilizing an E-core pick-off. The instrument of my invention is adapted for measuring the frequency of a vibration, the amplitude, velocity, or acceleration of a vibration; or a constant acceleration; or an angular displacement from the vertical or tilt position. The instrument of my invention is extremely compact in size and may be assembled from a minimum number of parts with high electrical and mechanical efficiency.

Referring to the drawings in detail, Fig. 1 illustrates the theory involved in the instrument of my invention which consists in a laminated magnetic E core 1, having three vertically extending legs 1a, 1b, and 1c arranged in a stack. Each of the legs has a winding thereon designated at 2a, 2b, and 2c. The center winding 2b is excited by a small oscillator represented at 3 while the outputs of the other two coils 2a and 2c are electrically connected in series in bucking relation and the circuit connected to the input of amplifier 4 whose output is applied to the rectifier 5 and then connected to the direct current measuring instrument 6. As long as the magnetic circuit linking the center excited coil and the two symmetrically located measuring coils is symmetrical, no voltage is induced in the measuring coils. Only a small unbalance, however, is required to produce a comparatively large output voltage. In this particular case, the unbalance is produced by the motion of an iron slug 7 supported by a piece of spring steel 8, this representing the mechanical portion of an accelerometer. This iron slug would be attached to any member whose displacement it was desired to measure. In any case, the mass of moving elements should be sufficiently high to prevent appreciable response at the frequency used to drive the exciting coil 2b. This is required to prevent any coercive forces from being developed.

Figs. 2 and 3 show the relative displacement of the iron slug 7 with respect to the electrical output characteristics of the instrument. Fig. 2 shows the relationship of increments of displacement of the slug 7 as compared to the milliamperes of current generated in windings 2a and 2c. Fig. 3 illustrates the variation in output current due to the lateral swinging of the slug 7 across the path of the E core. Since it is also possible to obtain output variation by moving the slug perpendicularly to the coils, the mechanical arrangement should be such as to allow only one motion. An attempt to damp the mechanical portion of the accelerometer by eddy currents was made but did not appear feasible without using extremely strong magnets; consequently, oil damping is used. The entire instrument may be enclosed within a case within which the moving parts may be submerged in oil for damping the spring 8.

Fig. 4 is a front elevational view of one of the practical embodiments of the electromagnetic accelerometer of my invention which is supported on a panel structure 9 preferably of insulation material from which extends adjacent the upper end thereof the laterally projecting standard 10 having a flat vertical face against which the upper end of the spring strip is clamped by means of bar 12 secured in position by means of screws 14 which pass through bar 12 and enter standard 10. Spring strip 8 depends downwardly from standard 10 and clamping bar 12 and has the soft iron slug 7 attached to the end thereof forming a pendulum. The iron slug 7 is free to move against the spring action of the beam constituted by the strip 8 across the upstanding legs 1a, 1b and 1c of the E-shaped core 1. The length of the iron slug 7 is sufficient to wholly bridge any two of the upstanding legs of the E-shaped core 1. As the slug 7 moves across the upper ends of the legs 1a, 1b and 1c in close spacial relation thereto the couplings between the windings 2a, 2b and 2c on the E-shaped core is varied. Linear acceleration of the body of the accelerometer which is attached through lugs 9a to the mobile body whose linear acceleration is to be measured causes a deflection of the depending beam or strip 8 and relative motion of the mass 7 across the magnetic gaps between the legs 1a, 1b and 1c of the E-shaped core.

The electromagnetic windings 2a, 2b and 2c are so associated with the legs 1a, 1b and 1c of the E-shaped core that winding 2b on the center leg 1b serves as a primary winding of a transformer system. Windings 2a and 2c on the legs 1a and 1c operate as secondary windings and are so wound and wired that with equal couplings with the primary winding 2b their outputs are equal and bucking, hence, under this condition, there is no output from the transformer. Motion of the iron slug 7 across the gaps of the E-shaped core causes an increase in the coupling on one side of the transformer and a decrease in the coupling on the other side, with a resulting inequality in the two secondary outputs from windings 2a and 2c and a net output from the transformer. This output, when calibrated, is a measure of the acceleration of the body of the accelerometer. This system may be used to measure displacements other than those caused by accelerations by causing the body, the displacement of which is to be measured, to move the iron slug across the gaps in the E-coil transformer in such a way as to appropriately vary the couplings as previously described.

The position of the E-shaped core 1 is accurately predetermined with respect to the center of the axis of the iron slug 7 and the E-shaped core clamped into position in the alignment with the exact central axis of the iron slug 7 and depending beam or strip 8, as shown more clearly in Figs. 7 and 8. This is accomplished by means of a bracket-like projection which extends from the panel 9 and which is slotted at 16 to receive the E-shaped core 1. The E-shaped core 1 is clamped against abutment face 17 on bracket-like projection 15 by means of clamping screws 18 which extend through screw-threaded apertures in the upstanding portion 17 of bracket-like projection 15. The beam or strip 8 may be precisely centered at its point of suspension by loosening clamping bar 12 with respect to standard 10 and aligning the beam or strip 8 with the center of E-shaped core 1.

Panel 9 may be spaced from a mobile body structure to which it is attached by screws fastened through lugs 9a by means of bosses or feet 20.

Screw-threaded members 21, 22, 23, 24, 25 and 26 extend from the front of panel 9 and serve as a fastening means for a cover 27. Gaskets 21a, 22a, 23a, 24a, 25a and 26a are associated with each of the screw-threaded members 21—26 and serve to maintain the cover 27 in fluid-tight position on the panel 9. The cover 27 coacts with a suitable gasket 28 set in a groove in panel 9 forming a liquid-tight seal around the accelerometer. A suitable removable plug 29 is provided in the accelerometer case 27 to permit the filling of the case with oil to provide damping for the moving beam or strip 8.

Electrical connections are brought out from the windings 2a, 2b and 2c through conductors, the inner ones of which pass through slot 15a formed in bracket-like projection 15. Terminal screws 30, 31, 32, 33, 34 and 35 enter laterally extending busses within panel 9 and which receive terminal screws represented at 36, having connection lugs represented at 37 extending downwardly therefrom to permit electrical connection to be made with the accelerometer windings without disturbing the moving parts thereof.

In carrying out my invention I have secured very effective results in a structure in which the E-shaped laminations of the core are formed from .014" audio annealed audio 58 steel where the dimensions of the core are 1½" x $\frac{11}{16}$". 1000 turns provided on the center leg constituting the primary winding 2b have been used and connected with an exciting oscillator of 2.5 kc. The secondary system constituted by windings 2a and 2c has employed windings of 300 turns each. The iron slug or magnetic mass which bridges the gaps of the E-shaped core has been dimensioned in this particular unit as ½" x ½" x ¾". The dimensions given are not to be considered in a limiting sense but merely to illustrate one embodiment of my invention.

I have found the accelerometer of my invention as herein described highly practical and efficient in its production and operation, but I realize that modifications may be made and I desire it to be understood that no limitations upon my invention are intended other than may be imposed by the scope of the appended claims.

What I claim as new and desire to secure by Letter Patent of the United States is as follows:

1. An electromagnetic accelerometer comprising an E-shaped magnetic core structure having vertically extending legs, an electromagnetic winding carried by each of said legs, an energizing source connected with one of said windings, measuring apparatus connected with the others of said windings, and a magnetic mass suspended vertically over said legs and displaceable in accordance with the acceleration of a mobile body with which said mass is associated in a transverse path across said legs for varying the magnetic path between the legs of said core structure and correspondingly controlling the measuring apparatus.

2. An apparatus for indicating the linear accelerations of mobile bodies comprising a mounting structure carried by a mobile body, an E-shaped magnetic core supported by said mounting structure and having vertically extending legs thereon, an electromagnetic winding on each of said legs, an exciting means connected with one of said windings, a measuring apparatus connected with the other of said windings, a magnetic mass, means for suspending said magnetic mass on said mounting structure directly above the legs of said E-shaped magnetic core whereby acceleration of the mobile body carrying said mounting structure operates to displace said magnetic mass in a transverse path across said legs for controlling the magnetic path through said E-shaped core and correspondingly controlling said measuring apparatus.

3. An electromagnetic accelerometer for measuring accelerations of mobile bodies comprising a mounting structure attachable to a mobile body, a pendulum suspension member connected to said mounting structure, a magnetic mass carried by said pendulum suspension member, an E-shaped magnetic core supported by said mounting structure having vertically extending legs projecting toward the path of movement of said magnetic mass, electromagnetic windings carried by the legs of said core, one of said windings being excited by an energizing source and the other of said windings being connected with a measuring apparatus, said magnetic mass being displaceable in a transverse direction across the magnetic path through said legs in accordance with the acceleration of the mobile body for correspondingly controlling said measuring apparatus.

4. An electromagnetic accelerometer as set forth in claim 3 in which the pendulum suspension member comprises a flat resilient strip adapted to flex in a vertical plane passing through the legs of said E-shaped magnetic core.

5. An electromagnetic accelerometer as set forth in claim 3 in which said pendulum suspension member comprises a resilient flexible strip member, and means for damping the movement of said magnetic mass and said pendulum suspension member.

6. An electromagnetic accelerometer as set forth in claim 3 in which the pendulum suspension member consists of a flat resilient strip adapted to flex in a vertical plane passing through the legs of said E-shaped core structure, and means for submerging said magnetic mass and said pendulum suspension member in a fluid for damping the movement of said mass and said pendulum suspension member.

7. An electromagnetic accelerometer comprising a supporting structure attached to a mobile body, a flexible resilient suspension member depending from said supporting structure, a magnetic mass carried by said member, an E-shaped magnetic core having vertically extending legs thereon terminating in close proximity to the path of movement of said magnetic mass, said magnetic mass being displaceable in accordance with the acceleration of the mobile body with which said supporting structure is associated, an electromagnetic winding carried by each of the legs of said core, the winding on the center leg of said core operating as a primary winding of a transformer system, an exciting source connected with the said primary winding, the other two of said windings being connected in series and constituting a secondary winding coupled with said primary winding and connected in a series path to a measuring apparatus, the relationship of said last mentioned two windings to said first mentioned winding being such that with equal couplings between the primary and secondary windings, the outputs of the said two windings are bucking and neutralize each other to provide no output from the transformer to the measuring apparatus and whereby displacement of said magnetic mass in a transverse path across the gaps between the E-shaped legs causes an increase in coupling on one side of the transformer and a decreasing coupling on the opposite side thereof with a resulting inequality in the outputs from the said two windings for effecting a measurement on said measuring apparatus.

JOHN G. KING.

REFERENCES CITED

The following references are of record in the file of this patent:

UNITED STATES PATENTS

| Number | Name | Date |
|---|---|---|
| Re. 22,409 | Lyman et al. | Dec. 21, 1943 |
| 2,090,521 | Serrell | Aug. 17, 1937 |
| 2,193,910 | Wilson | Mar. 19, 1940 |
| 2,266,449 | Ullrich et al. | Dec. 16, 1941 |
| 2,359,245 | Ritzmann | Sept. 26, 1944 |
| 2,455,939 | Meredith | Dec. 14, 1948 |